(12) United States Patent
Noda

(10) Patent No.: US 7,826,113 B2
(45) Date of Patent: Nov. 2, 2010

(54) JOINED OPTICAL MEMBER, IMAGE DISPLAY APPARATUS, AND HEAD-MOUNTED DISPLAY

(75) Inventor: Tetsuya Noda, Tenri (JP)

(73) Assignee: Konica Minolta Holdings, Inc., Tokyo (JP)

( * ) Notice: Subject to any disclaimer, the term of this patent is extended or adjusted under 35 U.S.C. 154(b) by 336 days.

(21) Appl. No.: 12/055,589

(22) Filed: Mar. 26, 2008

(65) Prior Publication Data

US 2008/0239422 A1 Oct. 2, 2008

(30) Foreign Application Priority Data

Mar. 28, 2007 (JP) ............................. 2007-083902
Jan. 17, 2008 (JP) ............................. 2008-007520

(51) Int. Cl.
*G03H 1/00* (2006.01)
*B29D 11/00* (2006.01)

(52) U.S. Cl. .......................... 359/13; 359/900; 264/1.31

(58) Field of Classification Search ............. 359/13–15, 359/359, 360, 576, 580–590, 883, 896, 900; 264/1.31, 1.33, 1.34, 1.36–1.38, 1.7, 1.8
See application file for complete search history.

(56) References Cited

U.S. PATENT DOCUMENTS

| | | | | | |
|---|---|---|---|---|---|
| 4,895,767 | A | * | 1/1990 | Mori et al. | 428/447 |
| 5,589,239 | A | * | 12/1996 | Tomono et al. | 428/34 |
| 5,812,316 | A | * | 9/1998 | Ochi et al. | 359/530 |
| 6,493,128 | B1 | * | 12/2002 | Agrawal et al. | 359/265 |
| 6,660,326 | B2 | * | 12/2003 | Sano et al. | 427/180 |
| 6,950,248 | B2 | * | 9/2005 | Rudischhauser et al. | 359/811 |
| 7,190,517 | B2 | * | 3/2007 | Abe et al. | 359/457 |
| 2006/0119948 | A1 | * | 6/2006 | Matsumoto et al. | 359/624 |
| 2007/0195404 | A1 | * | 8/2007 | Iijima | 359/359 |
| 2009/0286015 | A1 | * | 11/2009 | Matsukawa et al. | 428/1.1 |

FOREIGN PATENT DOCUMENTS

JP 6-308349 A 11/1994
JP 2006-195073 A 7/2006

\* cited by examiner

*Primary Examiner*—Frank G Font
(74) *Attorney, Agent, or Firm*—Sidley Austin LLP

(57) ABSTRACT

In a joined optical member, let the adhesion strength between a surface coating layer and an eyepiece prism be A1, the adhesion strength between the surface coating layer and a deflector prism be A2, the adhesion strength between the surface coating layer and adhesive be A3, and the adhesion strength between, at one end, the adhesive and, at the other, the eyepiece prism and the deflector prism be A4, then A1 (A2)>A3 and simultaneously A4>A3. This makes removal of superfluous adhesive on the surface coating layer easy, and prevents scratches on the exterior surfaces. Even after removal of superfluous adhesive, the surface coating layer remains on the exterior surfaces of the eyepiece prism and the deflector prism. This prevents scratches on the exterior surfaces in actual use, and prevents degradation of optical performance.

32 Claims, 8 Drawing Sheets

JOINED OPTICAL MEMBER, IMAGE DISPLAY APPARATUS, AND HEAD-MOUNTED DISPLAY

This application is based on Japanese Patent Application No. 2007-083902 filed on Mar. 28, 2007 and Japanese Patent Application No. 2008-007520 filed on Jan. 17, 2008, the contents of which are hereby incorporated by reference.

BACKGROUND OF THE INVENTION

1. Field of the Invention

The present invention relates to a joined (or bonded, or cemented) optical member having a plurality of optical members (part optical members) joined together with adhesive, also relates to an image display apparatus incorporating such a joined optical member, and further relates to a head-mounted display (hereinafter also "HMD") incorporating such an image display apparatus.

2. Description of Related Art

When two optical members are joined together with adhesive to form a joined optical member, the superfluous adhesive that oozes out from between the joined surfaces needs to be removed. This is achieved by, for example, the method disclosed in JP-A-H6-308349. According to this method, first the adhesive applied inside of the outer edges of the joined surfaces is hardened, and then the adhesive that has oozed outside of the outer edges of the joined surfaces is, still in its unhardened state, removed. Wiping off superfluous adhesive in its unhardened state in this way helps achieve easy and complete removal of the adhesive.

Wiping off adhesive in its unhardened state, however, results in more unhardened adhesive than needs to be wiped off being removed, leaving a recess along the joint seam (the border between the individual optical members joined together). This may degrade, for example, the optical performance with which an outside world image can be viewed through the joint seam.

On the other hand, for example, according to the method disclosed in JP-A-2006-195073, a coating layer is formed on the exterior surfaces of two optical members, then adhesive is hardened, and then the adhesive that has oozed outside of the coating layer is, in its hardened state, removed. Removing superfluous adhesive after hardening it in this way helps avoid removal of more adhesive than should be removed, and thus helps prevent degradation of the optical performance with which an outside world image can be viewed through the joint seam.

Inconveniently, however, with the method disclosed in JP-A-2006-195073 mentioned above, the coating layer is removed either after the superfluous adhesive is removed or at the same time that it is removed. This results in an unsatisfactory effect of preventing scratches on the exterior surfaces of the individual optical members. That is, when the superfluous adhesive is removed, the coating layer present between the exterior surfaces of the optical members and the adhesive offers a certain effect of preventing scratches on the exterior surfaces; in actual use of the joined optical member, however, since no coating layer is present on the exterior surfaces any longer, no effect of preventing scratches on the exterior surfaces is obtained. This may lead to degraded optical performance when those exterior surfaces are used as optical surfaces.

SUMMARY OF THE INVENTION

In view of the conventionally encountered inconveniences mentioned above, it is an object of the present invention to provide a joined optical member that offers a stronger effect of preventing scratches on the exterior surfaces of individual optical members than conventionally achieved and that can, in particular, prevent degradation of optical performance on optical surfaces in actual use, and it is also an object of the invention to provide an image display apparatus incorporating such a joined optical member and an HMD incorporating such an image display apparatus.

According to one aspect of the invention, a joined optical member includes a plurality of part optical members joined together with adhesive, and is formed by—forming, before the part optical members are joined together, a surface coating layer on the surfaces of the part optical members that will remain as exterior surfaces after the part optical members are joined together; then joining together the part optical members with the adhesive applied on the joined surfaces thereof, then hardening the adhesive until the superfluous part thereof that has oozed outside of the surface coating layer loses fluidity; and then wiping off the superfluous part of the adhesive. Here, the relationship in adhesion strength among different pairs of materials is such that (the adhesion strength between the surface coating layer and the part optical members)>(the adhesion strength between the surface coating layer and the adhesive) and simultaneously (the adhesion strength between the part optical members and the adhesive)>(the adhesion strength between the surface coating layer and the adhesive).

According to another aspect of the invention, a joined optical member includes a plurality of part optical members joined together with adhesive, and is formed by—forming, before the part optical members are joined together, a surface coating layer on the surfaces of the part optical members that will remain as exterior surfaces after the part optical members are joined together; then joining together the part optical members with the adhesive applied on the joined surfaces thereof, then hardening the adhesive until the superfluous part thereof that has oozed outside of the surface coating layer loses fluidity; and then wiping off the superfluous part of the adhesive. Here, the surface hardness of the surface coating layer is higher than the surface hardness of the part optical members.

Thus, according to the invention, a surface coating layer is formed on the surfaces of part optical members that will remain as exterior surfaces after the part optical members are joined together, and the superfluous part of adhesive that has oozed outside of the surface coating layer is wiped off after it has hardened until it loses fluidity (that is, in a fully or half-hardened state). This helps prevent a recess from being formed in the adhesive between the joined surfaces, and thus helps prevent removal of more adhesive than is superfluous. Thus, it is possible to prevent degradation of the optical performance with which an outside world image can be viewed through the joint seam.

Moreover, either the relationship in adhesion strength among different pairs of materials is such that (the adhesion strength between the surface coating layer and the part optical members)>(the adhesion strength between the surface coating layer and the adhesive) and simultaneously (the adhesion strength between the part optical members and the adhesive)>(the adhesion strength between the surface coating layer and the adhesive), or the surface hardness of the surface coating layer is higher than the surface hardness of the part optical members. Thus, not only during removal of superfluous adhesive, but also in actual use, it is possible to prevent scratches on the exterior surfaces of the individual optical members, and thereby to obtain a stronger effect of preventing scratches than conventionally achieved. It is possible, in particular, to prevent degradation of optical performance on optical surfaces in actual use.

BRIEF DESCRIPTION OF THE DRAWINGS

These and other objects and features of the present invention will be apparent from the following detailed description of preferred embodiments thereof taken in conjunction with the accompanying drawings, in which.

DETAILED DESCRIPTION OF PREFERRED EMBODIMENTS

Embodiments of the invention will be described below with reference to the accompanying drawings.

1. HMD

Figure 2A:
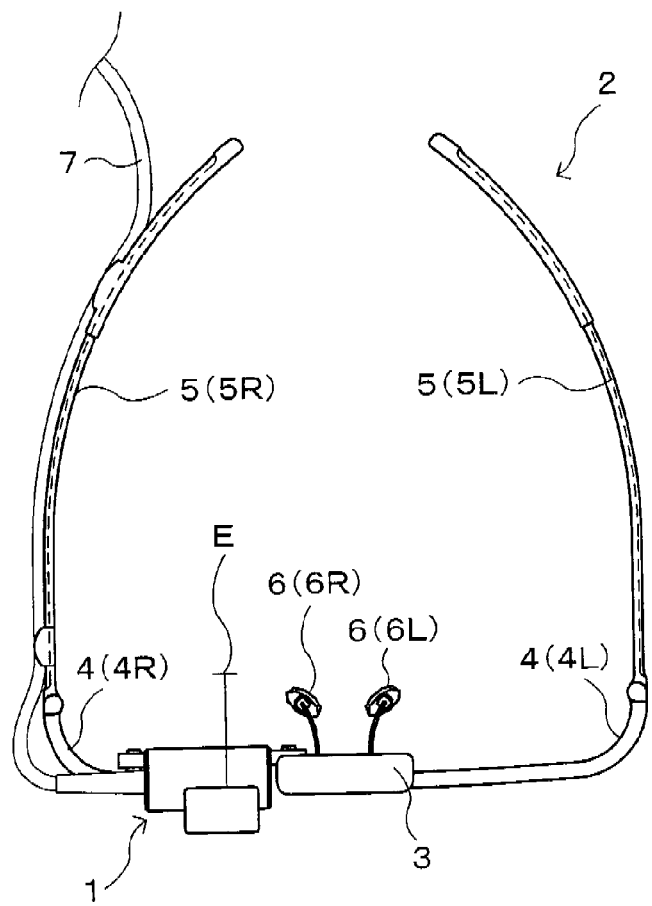
FIG. 2A is a plan view showing an outline of the structure of a HMD.
Figure 2B:
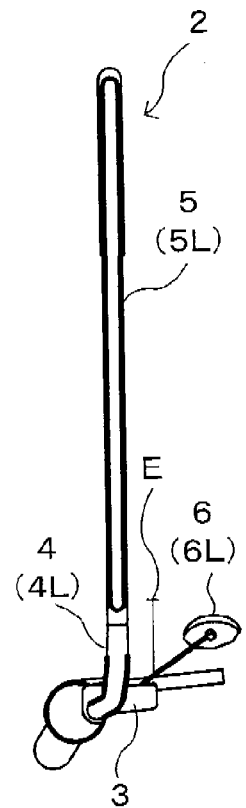
FIG. 2B is a side view of the HMD.
Figure 2C:
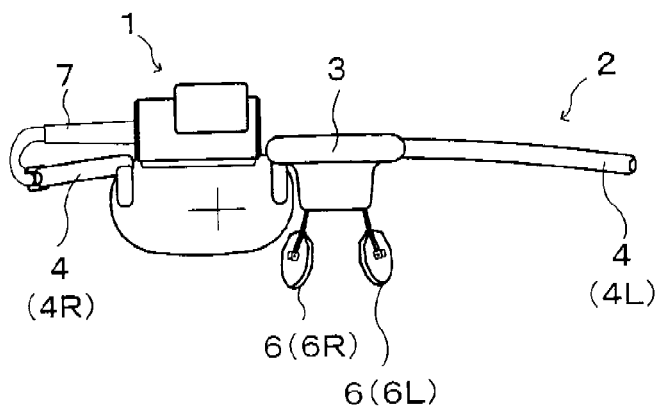
FIG. 2C is a front view of the HMD.

FIG. 2A is a plan view showing an outline of the structure of a HMD according to the invention, FIG. 2B is a side view of the HMD, and FIG. 2C is a front view of the HMD. The HMD has an image display apparatus 1 and a support mechanism 2 that supports it. As a whole, the HMD has an exterior appearance like that of common eye glasses with one lens (for example, the left-eye lens) removed.

The image display apparatus 1 allows a viewer to view an outside world image in a see-through fashion, and simultaneously displays an image to present it as a virtual image to the viewer. In the image display apparatus 1 shown in FIG. 2C, the part thereof corresponding to the right-eye lens of eyeglasses is composed of an eyepiece prism 22 and a deflector prism 23 (for both, see FIG. 3), which will each be described later, joined together. The structure of the image display apparatus 1 will be described in detail later.

The support mechanism 2 serves as means for supporting the image display apparatus 1 in front of a viewer's eye (for example, in front of his right eye). The support mechanism 2 has a bridge 3, frames 4, temples 5, nose pads 6, and a cable 7. The frames 4, the temples 5, and the nose pads 6 are provided in pairs of a right one and a left one; wherever distinction between the right and left ones is necessary, these are referred to individually as the right frame 4R, the left frame 4L, the right temple 5R, the left temple 5L, the right nose pad 6R, and the left nose pad 6L.

One end of the image display apparatus 1 is supported by the bridge 3. The bridge 3 supports not only the image display apparatus 1 but also the left frame 4L and the nose pads 6. The left frame 4L pivotally supports the left temple 5L. The other end of the image display apparatus 1 is supported by the right frame 4R. The end of the right frame 4R opposite from the end thereof supporting the image display apparatus 1 pivotally supports the right temple 5R. The cable 7 includes leads across which external signals (for example, a video signal and a control signal) and electric power are fed to the image display apparatus 1. The cable 7 is laid along the right frame 4R and the right temple 5R.

When a viewer uses the HMD, he wears it on his head as if wearing common eye glasses, with the right temple 5R and the left temple 5L put on the right and left sides of the head, and with the nose pads 6 put on the nose. In this state, when an image is displayed by the image display apparatus 1, the viewer can view a virtual image of the image displayed by the image display apparatus 1, and can simultaneously view an outside world image through the image display apparatus 1 in a see-through fashion.

With the HMD structured as described above, since the image display apparatus 1 is supported in front of the viewer's eye by the support mechanism 2, the viewer have his hands free. Thus, the user can, while viewing the outside world image along with (a virtual image of) the image displayed by the image display apparatus 1, do what he wants to do with his free hands. Moreover, since the viewer can keep his viewing direction fixed, he can easily find the displayed image even in a low-light environment.

Although the HMD shown in FIGS. 2A, 2B, and 2C is provided with only one image display apparatus 1, needless to say, it may be provided with two image display apparatuses 1, one for the left eye and the other for the right eye.

2. Image Display Apparatus

Figure 3:
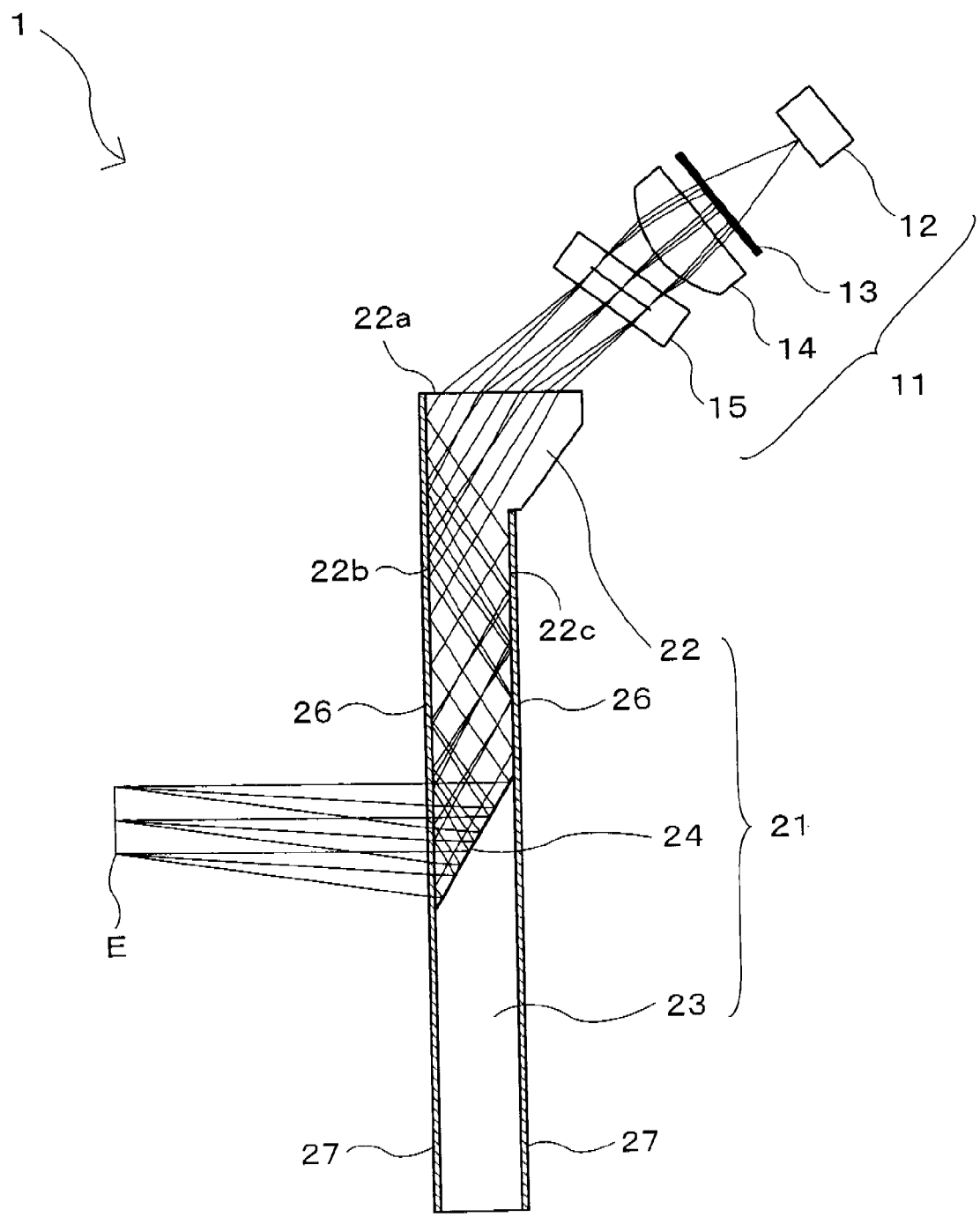
FIG. 3 is a sectional view showing an outline of the structure of the above image display apparatus.

Next, the image display apparatus 1 mentioned above will be described in detail. FIG. 3 is a sectional view showing an outline of the structure of the image display apparatus 1. The image display apparatus 1 is composed of an image display section 11 and an eyepiece optical system 21. The image display section 11 has a light source 12, a unidirectional diffuser plate 13, a condenser lens 14, and an LCD 15.

The light source 12 is built with an RGB composite LED that emits light in three wavelength bands of which the center wavelengths are, for example, 465 nm, 520 nm, and 635 nm respectively. The unidirectional diffuser plate 13 diffuses the illumination light from the light source 12, and it diffuses light with different degrees of diffusion in different directions. More specifically, the unidirectional diffuser plate 13 diffuses incident light at an angle of about 40° in the direction (perpendicular to the plane of FIG. 3) corresponding to the left/right direction as seen from the viewer wearing the HMD, and diffuses incident light at an angle of about 0.2° in the direction (parallel to the plane of FIG. 3) corresponding to the up/down direction as seen from the viewer wearing the HMD. The condenser lens 14 condenses the light diffused by the unidirectional diffuser plate 13. The condenser lens 14 is so arranged that the diffused light efficiently forms an optical pupil E.

The LCD 15 is an image display element that displays an image by modulating the light from the light source 12 according to an image signal. In this embodiment, the LCD 15 is of the transmissive type, but it may be of the reflective type. In that case, the other optical elements such as the light source 12 need to be arranged accordingly. A light modulation element of any other type than an LCD (for example, a DMD—Digital Micromirror Device—manufactured by Texas Instruments Incorporated) may be used as an image display element.

On the other hand, the eyepiece optical system 21 is composed of an eyepiece prism 22 and a deflector prism 23 joined (or bonded, or cemented) together with an optical element 24 held therebetween. The eyepiece prism 22 and the deflector prism 23 are so joined that their joined parts form continuous surfaces. The optical surfaces of the eyepiece prism 22 and the deflector prism 23—that is the surfaces thereof at which image light is reflected and let out and at which the light of the outside world image is transmitted—are coated with surface coating layers 26 and 27. This will be described later.

The eyepiece prism 22 and the deflector prism 23 are formed of, for example, acrylic resin (described later), and are joined together with adhesive. The eyepiece prism 22 has the shape of a plane-parallel plate of which a bottom end part is wedge-shaped and of which a top end part is thickened. The eyepiece prism 22 has surfaces 22a, 22b, and 22c. The surface 22a is an entrance surface on which the image light from the image display section 11 is incident. The surfaces 22b and 22c lie opposite each other, the surface 22b serving as both a total-reflection surface and an exit surface.

The deflector prism 23 has the shape of a plane-parallel plate of which a top end part has a shape that fits the bottom end part of the eyepiece prism 22 so that, together with the eyepiece prism 22, the deflector prism 23 forms a substantially plane-parallel plate. If the eyepiece prism 22 and the deflector prism 23 are not joined together, when the light of the outside world image passes through the wedge-shaped bottom end part of the eyepiece prism 22, it is refracted there. This produces distortion in the outside world image viewed through the eyepiece prism 22. By contrast, when the eyepiece prism 22 and the deflector prism 23 are joined together to form a single piece of a substantially plane-parallel plate, the refraction that acts upon the light from the outside world image when it passes through the wedge-shaped bottom end part of the eyepiece prism 22 is canceled by the deflector prism 23. It is thus possible to prevent distortion in the outside world image viewed in a see-through fashion.

The optical element 24 may be, for example, a half-mirror, but, here, it is a volume-phase reflection hologram optical element (HOE) that diffracts light in three wavelength bands of, for example, 465±10 nm, 520±10 nm, and 635±10 nm incident thereon at particular angles of incidence. The optical element 24 is bonded on the slanted surface of the bottom end part of the eyepiece prism 22, and is thus held between the eyepiece prism 22 and the deflector prism 23.

In the image display apparatus 1 structured as described above, the light emitted from the light source 12 provided in the image display section 11 is diffused by the unidirectional diffuser plate 13, is then condensed by the condenser lens 14, and then enters the LCD 15. The light that has entered the LCD 15 is modulated according to a video signal, and then exits, as image light, from the LCD 15. Thus, an image is displayed on the LCD 15.

The image light from the LCD 15 enters the eyepiece prism 22—provided in the eyepiece optical system 21—via the top end surface (the surface 22a) thereof, is then totally reflected a plurality of times between the two opposite surfaces 22b and 22c, and is then incident on the optical element 24. The light that has struck the optical element 24 is reflected thereon, then exits via the surface 22b, and then reaches the optical pupil E. At the position of the optical pupil E, the viewer can view an enlarged virtual image of the image displayed on the LCD 15. The distance from the optical pupil E to the virtual image is of the order of meters, and the size of the virtual image is ten or more times that of the image displayed on the LCD 15.

On the other hand, the eyepiece prism 22, the deflector prism 23, and the optical element 24 transmit almost all of the light from the outside world, and thereby allow the viewer to view an outside world image. Thus, the virtual image of the image displayed on the LCD 15 is viewed in a form overlaid on part of the outside world image. As will be understood from the foregoing, the optical element 24 functions as a combiner that directs the image (image light) presented by the image display section 11 and the outside world image (outside light) simultaneously to the viewer's eye.

As described above, in the image display apparatus 1, the image light emanating from the LCD 15 is directed to the optical element 24 by total reflection inside the eyepiece prism 22. This makes it possible to reduce the thickness of the eyepiece prism 22 and the deflector prism 23 to about 3 mm as in an ordinary eye-glasses lens, and thus to make the eyepiece optical system 21, and hence the image display apparatus 1, compact and lightweight. In addition, the light of the outside world image is transmitted with higher transmittance, and this allows satisfactory viewing of the outside world image. Furthermore, the image display section 11 can be arranged far away from immediately in front of the viewer's eye, and this helps secure the viewer a wide field of view for the outside world. Moreover, since a HOE is used as the optical element 24, matching the light emission wavelengths of the LED and the diffraction wavelengths of the HOE makes it possible to present the viewer with a bright image.

Moreover, since the optical element 24 is a volume-phase reflection hologram optical element that only diffracts light of particular wavelengths incident at particular angles of incidence, the image light from the LCD 15 does not affect the light of the outside world image transmitted through the eyepiece prism 22, the deflector prism 23, and the optical element 24. That is, since a volume-phase reflection hologram optical element has high wavelength selectivity and high angle selectivity, it only exerts its diffracting and reflecting action upon light in particular, limited wavelength bands; thus, the HOE can be made to function as a combiner element that merges light in particular wavelength bands, which it reflects, and light of other wavelengths, which it transmits. Thus, the viewer can view a virtual image of the image displayed by the LCD 15 via the optical element 24, and can simultaneously view, as usual and in addition clearly, the outside world image via the eyepiece prism 22, the deflector prism 23, and the optical element 24.

Moreover, since the optical element 24 is a combiner that directs the image light and the outside light simultaneously to the viewer's eye, the viewer can view the image presented by the LCD 15 via the eyepiece optical system 21, and can simultaneously view the outside world image via the eyepiece optical system 21 in a see-through fashion.

Moreover, the hologram optical element serving as the optical element 24 has a positive non-axisymmetric optical power to enlarge the image displayed on the LCD 15, and forms at least part of the eyepiece optical system 21 through which the displayed image is directed as a virtual image to the viewer's eye. This helps make the eyepiece optical system 21 compact, and makes it possible to present the viewer with a satisfactorily aberration-corrected image.

3. Method of Fabrication of the Optical Element

Next, how the optical element 24 described above is fabricated will be described briefly. The hologram optical element serving as the optical element 24 is fabricated, for example, by bonding a multiple-layer film serving as an optical film on the eyepiece prism 22 and then exposing it to laser light. The multiple-layer film has a base film, a barrier film, a photosensitive film, and a cover film laid one after another in this order. The base film, the barrier film, the photosensitive film, and the cover film have thicknesses of, for example, 50 μm, 5 μm, 20 μm, and 50 μm respectively.

The photosensitive film is formed of a photosensitive material such as a photopolymer, a silver-halide material, or gelatin dichromate. In this embodiment, a photopolymer is used, because it allows easy fabrication of the HOE by a dry process. The photosensitive film is formed of, in particular, a single-layer or three-layer photopolymer that is sensitive at wavelengths corresponding to the three primary colors of R (red), G (green), and B (blue).

The optical element 24 using a multiple-layer film as described above is fabricated by the following process. First, from a multiple-layer film in its supplied form, an appropriately sized piece of it is cut out. Here, simultaneously, a cut is formed along the border line between the region of the multiple-layer film which needs to be bonded on the eyepiece prism 22 and the region around it which does not need to be bonded. Then the cover film is removed from the multiple-layer film, then the multiple-layer film is positioned with respect to the eyepiece prism 22, and then, under the pressure of a rubber roller, the multiple-layer film is bonded on the joined surface of the eyepiece prism 22. Here, the photosensitive film side of the multiple-layer film fits on the eyepiece prism 22. Then the unnecessary-to-be-bonded region is removed so that only the necessary-to-be-bonded region remains on the joined surface of the eyepiece prism 22, and then the base film is removed from the necessary-to-be-bonded region.

Lastly, the photosensitive film is irradiated with two beams of coherent laser light so that the interference between the two beams produces a HOE. Here, by using, as the source of the laser light, one that emits light of three colors of R, G, and B, it is possible to produce a HOE that functions with the three colors of R, G, and B, that is, that diffraction-refracts R, G, and B light.

4. Details of the Eyepiece Optical System

Figure 4:
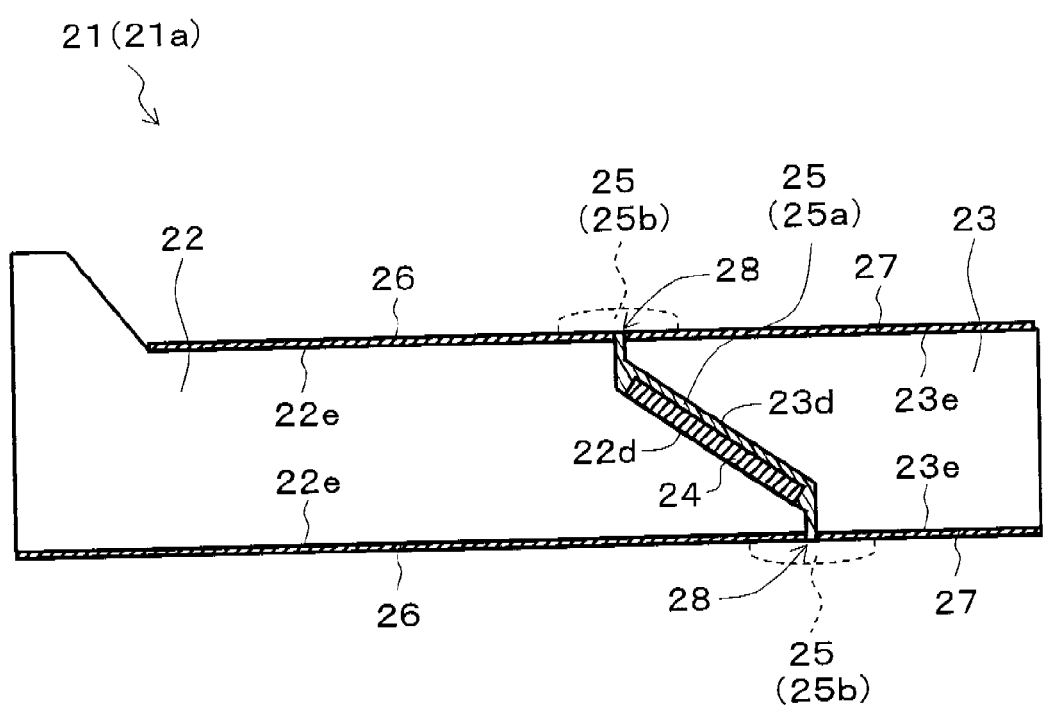
FIG. 4 is a sectional view showing an outline of the structure of the above eyepiece optical system.

Next, the structure of the eyepiece optical system 21 described above will be described in detail. FIG. 4 is a sectional view showing an outline of the structure of the eyepiece optical system 21. The eyepiece optical system 21 is built as a joined optical member 21a having, as a plurality of optical members (part optical members), the eyepiece prism 22 and the deflector prism 23 joined together with adhesive 25. The optical element 24 described above is embedded between the joined surface (the surface 22d) of the eyepiece prism 22 and the joined surface (the surface 23d) of the deflector prism 23.

The surfaces 22e and 23e of the eyepiece prism 22 and the deflector prism 23 which will remain as exterior surfaces after they are joined together are coated with surface coating layers 26 and 27 respectively, and these surface coating layers 26 and 27 protect the surfaces 22e and 23e. The surface coating layers 26 and 27 are formed on the surfaces 22e and 23e of the eyepiece prism 22 and the deflector prism 23 by vacuum deposition, sputtering, or the like beforehand, that is, before the eyepiece prism 22 and the deflector prism 23 are joined together. Incidentally, the surface 22e of the eyepiece prism 22, more specifically, consists of the surfaces 22b and 22c mentioned above.

The joined optical member 21a is fabricated as follows: the adhesive 25 is applied to at least one of the surfaces 22d and 23d, and the eyepiece prism 22 and the deflector prism 23 are then joined together; thereafter, the part of the adhesive 25 that has oozed out from between the surfaces 22d and 23d to outside of the surface coating layers 26 and 27 is, after it has hardened, wiped off and removed. Wherever distinction is needed between the part of the adhesive 25 which stays between the surfaces 22d and 23d and the part of the adhesive 25 which oozes outside of the surface coating layers 26 and 27 and which will eventually be removed after having hardened, the former will be referred to as "adhesive 25a" and the latter as "adhesive 25b".

In this embodiment, the to-be-removed—superfluous—adhesive 25b that has oozed outside of the surface coating layers 26 and 27 during joining and that needs to be removed is, in its hardened state, wiped off and thereby removed. This helps prevent a recess from being formed in the adhesive 25a between the surfaces 22d and 23d, and thus helps prevent the adhesive 25a from being excessively removed. Thus, it is possible to prevent degradation of the optical performance with which an outside world image can be viewed through the joint seam 28 (the border between the eyepiece prism 22 and the deflector prism 23 joined together).

The adhesive 25b may be wiped off and removed in a fully hardened state, or in a half-hardened state. Here, "fully hardened state" denotes a state in which polymerization has completely eliminated the fluidity of the adhesive 25b and has fully hardened it. On the other hand, "half-hardened state" denotes a state in which polymerization has eliminated the fluidity of the adhesive 25b to such a degree as to turn it into a gel- or rubber-like constitution. In a half-hardened state, even when the adhesive 25b is tilted, it does not flow under its own weight.

Wiping off and removing the adhesive 25b in its half-hardened state offers benefits such as: "no splitting along the joint seam 28 occurs during wiping"; "weaker adhesion to the base member (optical members) than in a fully hardened state makes the wiping-off of the superfluous adhesive 25b easier"; and "the adhesive 25a at the joint seam 28 is not removed excessively". These benefits lead to enhanced workability. Even in a case where the adhesive 25b is wiped off and removed in its fully hardened state, the later-described differences in the adhesion strength between two materials make the wiping-off of the adhesive 25b easier.

The foregoing can be summed up thus: in this embodiment, the adhesive 25b that has oozed from between the joined surfaces to outside of the surface coating layers 26 and 27 needs to be wiped off and removed after it has hardened into a fully hardened, half-hardened, or similar state, that is, until it loses fluidity (gets into a non-fluid state).

The optical element 24 is embedded between the surfaces 22d and 23d of the eyepiece prism 22 and the deflector prism 23. It is thus possible to form an optical unit (the joined optical member 21a) in which the light introduced into the eyepiece prism 22 and guided through its inside is reflected on the optical element 24 and is thereby shone out of the eyepiece prism 22. Moreover, since the optical element 24 is isolated from outside air, it is possible to maintain stable optical performance.

Moreover, in this embodiment, after the eyepiece prism 22 and the deflector prism 23 are joined together, the joint seam 28 remains exposed at the exterior surface of the joined optical member 21a, and at least part of the joint seam 28 is included in at least part of the effective area of the optical surfaces (the surfaces 22e and 23e). Here, "the effective area of an optical surface" denotes the area thereof that functions as an optical area (transmissive or reflective area) in actual use. Thus, depending on how the joined optical member 21a is held in actual use (for example, whether it is held at part of the optical surfaces thereof or at any part thereof other than the optical surfaces), part of the optical surfaces (the part other the supported part) may be used as an effective area, or the entire optical surfaces may be used as an effective area.

In this embodiment, for the reasons stated later, it is easy to remove the adhesive 25b that has oozed outside of the surface coating layers 26 and 27 during joining. This makes it possible to form the joint seam 28 smooth along the surfaces 22e and 23e (so that the surfaces 22e and 23e form a continuous surface via the joint seam 28). Thus, even at the joint seam 28, light can be transmitted or reflected with satisfactory optical performance, allowing efficient use of the light obtained via the joint seam 28. In addition, even when at least part of the joint seam 28 is used as at least part of the effective area of the optical surfaces, the outside world image can be viewed with satisfactory optical performance through the area including the joint seam 28 (the effective area of the optical surfaces). That is, in a structure in which an outside world image is viewed through a joint seam 28, it is an advantage that the joint seam 28 can be formed smooth along the exterior surfaces without forming a recess along the joint seam 28.

4-1. Relationship in Adhesion Strength Between Components

Next, as one characteristic feature of the joined optical member 21a, the relationship in adhesion strength between components will be described. What specific materials to use to form these components to achieve such a relationship in adhesion strength will be described later.

In this embodiment, the relationship in adhesion strength among different pairs of materials in the joined optical member 21a is such that (the adhesion strength between the surface coating layer and the optical members)>(the adhesion strength between the surface coating layer and the adhesive) and simultaneously (the adhesion strength between the optical members and the adhesive)>(the adhesion strength between the surface coating layer and the adhesive). More specifically, let the adhesion strength between the surface coating layer 26 and the eyepiece prism 22 be A1, the adhesion strength between the surface coating layer 27 and the deflector prism 23 be A2, the adhesion strength between the surface coating layers 26 and 27 and the adhesive 25 be A3, and the adhesion strength between, at one end, the eyepiece prism 22 and deflector prism 23 and, at the other, the adhesive 25 be A4, then A1>A3 and simultaneously A4>A3, and in addition A2>A3 and simultaneously A4>A3.

Figure 1A:
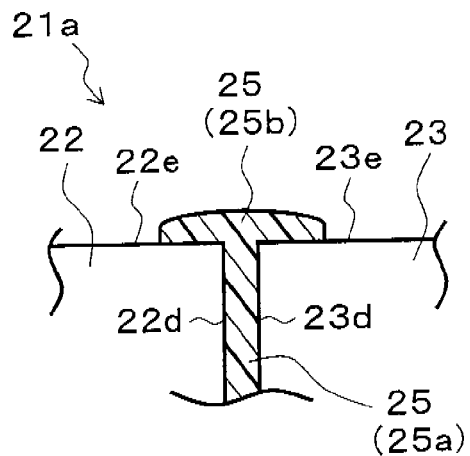
FIG. 1A is a sectional view of and around the joined parts of an eyepiece prism and a deflector prism having no surface coating layer formed on the exterior surfaces thereof, in an eyepiece optical system provided in an image display apparatus incorporated in a HMD according to the invention.
Figure 1B:
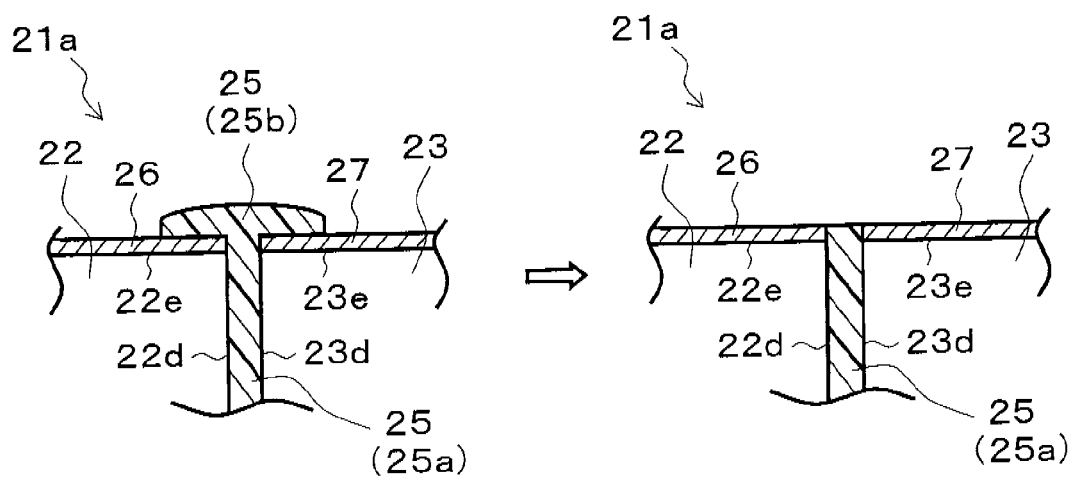
FIG. 1B is a sectional view of and around the joined parts of an eyepiece prism and a deflector prism having a surface coating layer formed on the exterior surfaces thereof.

FIG. 1A is a sectional view of and around the joined parts of an eyepiece prism 22 and a deflector prism 23 having no surface coating layer formed on the exterior surfaces 22a and 23e thereof, and FIG. 1B is a sectional view of and around the joined parts of an eyepiece prism 22 and a deflector prism 23 having surface coating layers 26 and 27, which fulfill the above relationship, formed on the exterior surfaces 22a and 23e thereof.

In the fabrication of the joined optical member 21a involving joining together the eyepiece prism 22 and the deflector prism 23 with the adhesive 25 applied on the joined parts thereof and hardening the adhesive 25, if no surface coating layer is present on the exterior surfaces as in FIG. 1A, the to-be-removed adhesive 25b that oozes out from between the joined parts of the eyepiece prism 22 and the deflector prism 23 when these are joined together stays directly on the exterior surfaces of those prisms after the joining. The adhesive 25 is intended to join together the two optical members, and naturally has strong adhesion to both the eyepiece prism 22 and the deflector prism 23. Thus, if no surface coating layer is present on the exterior surfaces of the optical members, it is difficult to wipe off the to-be-removed adhesive 25b. Even when the wiping is done with the adhesive 25 in a half-hardened state in which it is less hard, the adhesion strength with which the two optical members are joined together is about the same as the adhesion strength between the to-be-removed adhesive 25b and the optical members, and thus it is difficult to remove the adhesive 25b; that is, during wiping, the joined parts are more likely to split, and the exterior surfaces of the optical members are more likely to be scratched.

By contrast, when the surface coating layers 26 and 27 are formed on the exterior surfaces of the eyepiece prism 22 and the deflector prism 23 as shown in FIG. 1B before these are joined together, and the relationship in adhesion strength among different pairs of materials is such that (the adhesion strength between the surface coating layers and the optical members)>(the adhesion strength between the surface coating layers and the adhesive), since the adhesion strength between the surface coating layers 26 and 27 and the adhesive 25 is lower, the to-be-removed adhesive 25b on the surface coating layers 26 and 27 can easily be wiped off and removed. This helps reduce the time required to wipe off the adhesive 25b, contributing to enhanced workability.

Moreover, since the adhesion strength between, at one end, the surface coating layers 26 and 27 and, at the other, the eyepiece prism 22 and the deflector prism 23 is higher, the adhesive 25b can be wiped off and removed with the surface coating layers 26 and 27 left behind. That is, when the adhesive 25b is removed, the surface coating layers 26 and 27 do not come off the exterior surfaces of the eyepiece prism 22 and the deflector prism 23. This helps prevent scratches on the exterior surfaces of the eyepiece prism 22 and the deflector prism 23 during the removal of the adhesive 25b. Here, since the relationship in adhesion strength among different pairs of materials is such that (the adhesion strength between the optical members and the adhesive)>(the adhesion strength between the surface coating layers and the adhesive), and thus the adhesion strength between, at one end, the eyepiece prism 22 and the deflector prism 23 and, at the other, the adhesive 25 (especially, the adhesive 25a) is higher, when the adhesive 25b on the surface coating layers 26 and 27 is removed, the joined parts of the eyepiece prism 22 and the deflector prism 23, that is, the parts thereof which are joined together with the adhesive 25a, do not split.

Moreover, since the adhesion strength between, at one end, the surface coating layers 26 and 27 and, at the other, the eyepiece prism 22 and the deflector prism 23 is higher, it is possible to maintain, even after the adhesive 25b on the surface coating layers 26 and 27 is removed, the surface coating layers 26 and 27 on the exterior surfaces of the eyepiece prism 22 and the deflector prism 23. Thus, even in a case where, when the joined optical member 21a is actually used, the exterior surfaces thereof are used as optical surfaces, it is possible to prevent scratches on the optical surfaces, and to prevent degradation of optical performance on the optical surfaces.

That is, with the structure of the joined optical member 21a of this embodiment, at least not only during the removal of the adhesive 25b but also in actual use, it is possible to prevent scratches on the exterior surfaces of the eyepiece prism 22 and the deflector prism 23, and to obtain a stronger effect of preventing scratches than conventionally achieved. In particular, it is possible to prevent degradation of optical performance on the optical surfaces during actual use.

Figure 8A:
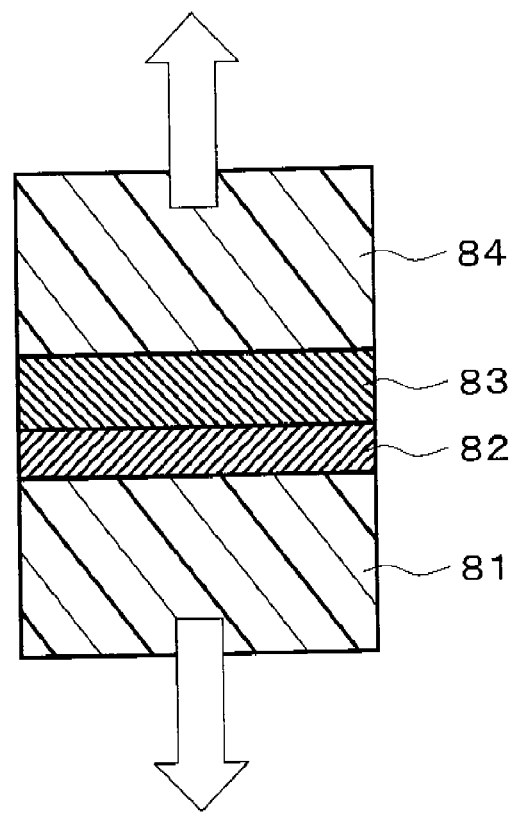
FIG. 8A is a sectional view showing an outline of the structure of a sample as a target for evaluating the relationship in adhesion strength among different pairs of materials.

The relationship (the differences) in adhesion strength among different pairs of materials can be easily evaluated in the following manner. FIG. 8A is a sectional view showing an outline of the structure of a sample as a target for evaluating the relationship in adhesion strength. This sample is formed by forming, on an optical member 81, a coating layer 82, adhesive 83, and an optical member 84 one after another in this order. The optical member 81, the coating layer 82, the adhesive 83, and the optical member 84 correspond to the eyepiece prism 22, the surface coating layer 26 (27), the adhesive 25, and the deflector prism 23 respectively. These layers all have the same surface area (the same joint surface), and are laid together parallel to one another.

Figure 8B:
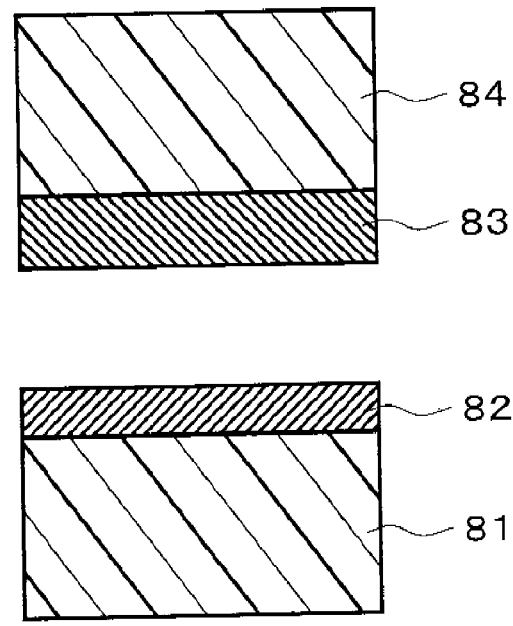
FIG. 8B is a sectional view showing the sample as observed after tensile stress is applied thereto.

From the state shown in FIG. 8A, when tensile stress (load) is applied to the optical members 81 and 84 perpendicularly to the joined surfaces so as to act in opposite directions, then, as shown in FIG. 8B, splitting occurs between the layers between which the adhesion is weakest. Specifically, in FIG. 8B, splitting occurs between the coating layer 82 and the adhesive 83, indicating that the adhesion between these two is weakest. Thus, in this sample, the relation in adhesion strength among different pairs of materials is such that (the adhesion strength between the coating layer 82 and the optical member 81)>(the adhesion strength between the coating layer 82 and the adhesive 83) and simultaneously (the adhesion strength between the optical member 84 and the adhesive 83)>(the adhesion strength between the coating layer 82 and the adhesive 83). In this way, it is possible to readily see which pair of materials has stronger or weaker adhesion than another. By measuring the force of the tensile stress that is instantaneously applied to the optical members 81 and 84, it is possible to evaluate numerically (in absolute terms) the differences in adhesion strength among different pairs of layers.

4-2. Materials of Components

Next, what materials to use to form the components of the joined optical member 21a to fulfill the above relationship will be described.

The eyepiece prism 22 and the deflector prism 23—the optical members—are formed of, for example, acrylic resin such as PMMA (polymethyl methacrylate) or MMA (methyl methacrylate) or cycloolefin-based resin such as ZEONEX or APEL. Such organic materials are all highly transparent and lowly birefringent, and forming the optical members out of one of them offers satisfactory optical performance (for example, in terms of transmittance).

The adhesive 25 is formed of, for example, an acrylic or cycloolefin-based organic material, that is, a material of the same family as the material of the eyepiece prism 22 and the deflector prism 23. This is because, materials of the same family exhibit strong adhesion between them. Moreover, such organic materials have many advantages such as: "high transparency"; "easy and very fast hardening on irradiation with ultraviolet rays or visible light"; and "an inconspicuous joint seam after joining owing to an index of refraction similar to that of the optical members formed of a material of the same family". This makes such organic materials very suitable as the adhesive 25 for joining the optical members together. Examples of the adhesive 25 include LCR629B (manufactured by Toagosei Co., Ltd.) and NOA76 (manufactured by Norland Products Inc.).

Forming, at one end, the eyepiece prism 22 and the deflector prism 23 and, at the other, the adhesive 25 out of organic materials of the same family allows easy control of adhesion strength among different pairs of materials, as in increasing the adhesion strength between, at one end, the eyepiece prism 22 and the deflector prism 23 and, at the other, the surface coating layers 26 and 27, which are formed of an inorganic material as will be described later, while reducing the adhesion strength between the adhesive 25 and the surface coating layers 26 and 27.

The surface coating layers 26 and 27 are formed of, for example, an inorganic material. In general, an organic material and an inorganic material have weak adhesion to each other. Thus, when the adhesive 25 is formed of an organic material as mentioned above and the surface coating layers 26 and 27 are formed of an inorganic material, the adhesive 25 on the surface coating layers 26 and 27 can easily be removed. Moreover, as will be described later, when formed of an inorganic material, the surface coating layers 26 and 27 have high surface hardness, and thus they help prevent the exterior surfaces (the surfaces 22e and 23e) of the eyepiece prism 22 and the deflector prism 23 from being scratched.

In particular, it is preferable that the surface coating layers 26 and 27 be formed of, among many inorganic materials, one that contains a metal oxide as a main ingredient. That is, it is preferable that the inorganic material mentioned above contain a metal oxide. The reasons will be described below.

Various studies have revealed the following: although an organic material and an inorganic material typically have weak adhesion to each other, an acrylic or cycloolefin-based material in its molded state and a metal oxide have strong adhesion to each other, and an adhesive that hardens on irradiation with ultraviolet rays or visible light and a metal oxide have weak adhesion to each other. Particularly noteworthy is the following finding: in a case where the eyepiece prism 22 and the deflector prism 23—the optical members—and also the adhesive 25 are all formed of acrylic resin, when the surface coating layers 26 and 27 are formed of a material that contains a metal oxide as a main ingredient, these exhibit strong adhesion to the eyepiece prism 22 and the deflector prism 23 in their molded state while exhibiting small adhesion to the adhesive 25 in its half-hardened state. In particular, when formed of a material that contains a metal oxide as a main ingredient, the surface coating layers 26 and 27 exhibit weak adhesion to the adhesive 25 hardened by irradiation to ultraviolet rays, and this tendency is particularly marked when the adhesive 25 is in a half-hardened state. It is preferable that the contents of the metal oxide as a main ingredient be 90% or less by weight. This is because the surface coating layers 26 and 27, when formed of a material that contains a metal oxide as a main ingredient, exhibit extremely strong adhesion to the eyepiece prism 22 and the deflector prism 23 as described above.

Owing to the properties of such an inorganic material containing a metal oxide, the to-be-removed adhesive 25b can easily be removed off the surface coating layers 26 and 27. Moreover, since the adhesion between, at one end, the eyepiece prism 22 and the deflector prism 23 and, at the other, the surface coating layers 26 and 27 is high, when the adhesive 25b is wiped off and removed, the surface coating layers 26 and 27 do not come off. Needless to say, since the adhesion between, at one end, the eyepiece prism 22 and the deflector prism 23 and, at the other, the adhesive 25a is high, their joined parts do not split.

Used as the metal oxide mentioned above is, for example, $SiO_x$ (where $1 \leq x \leq 2$), $TiO_2$, $Al_2O_3$, $Ta_2O_5$, or a mixture of any two or more thereof. For example, $SiO_x$ (where $1 \leq x \leq 2$)

can be formed by depositing SiO on the optical members in the presence of oxygen by vacuum deposition, sputtering, or the like; the deposited film then takes in oxygen atoms O to become $SiO_x$ (where $1 \leq x \leq 2$), depending on the amount of oxygen present during the formation of the surface coating layers 26 and 27, and depending on the environment in which the surface coating layers 26 and 27 are left after their formation.

As described above, by using as the metal oxide a material as mentioned above by vacuum deposition, sputtering, or the like, it is possible to easily form the surface coating layers 26 and 27 that exhibit strong adhesion to the eyepiece prism 22 and the deflector prism 23. In that case, depending on, in particular, the method of film formation used, it is possible to greatly vary the adhesion between, at one end, the eyepiece prism 22 and the deflector prism 23 and, at the other, the surface coating layers 26 and 27.

The reason that, although the eyepiece prism 22 and the deflector prism 23 are formed of a material of the same family as the material of the adhesive 25, the adhesion between, at one end, the eyepiece prism 22 and the deflector prism 23 and, at the other, the surface coating layers 26 and 27 is stronger than the adhesion between the surface coating layers 26 and 27 and the adhesive 25 is that, whereas the surface coating layers 26 and 27 can be formed (as a film) by vacuum deposition, sputtering, or the like to exhibit strong adhesion to the eyepiece prism 22 and the deflector prism 23, the adhesive 25 simply hardens on the surface coating layers 26 and 27 and thus does not exhibit strong adhesion to the surface coating layers 26 and 27.

That is, when the composition alone of the surface coating layers 26 and 27 thus formed is considered, since the eyepiece prism 22 and the deflector prism 23 are formed of a material of the same family as the material of the adhesive 25, the surface coating layers 26 and 27 appear to exhibit the same adhesion to both. In reality, however, on one hand, vacuum deposition, sputtering, or the like causes the coating material that gradually deposits on the eyepiece prism 22 and the deflector prism 23 to bond together on the eyepiece prism 22 and the deflector prism 23 to form a film. As a result of coating film formation taking place on the eyepiece prism 22 and the deflector prism 23 in this way, in the process of the surface coating layers 26 and 27 forming a hard coating film, they firmly adhere to the eyepiece prism 22 and the deflector prism 23. By contrast, on the other hand, the adhesive 25 hardens on the surface coating layers 26 and 27 already formed. Since the already formed surface coating layers 26 and 27 are formed of an inorganic material, the adhesion between the adhesive 25, which is formed of an organic material, and the surface coating layers 26 and 27 is weak.

Figure 5A:
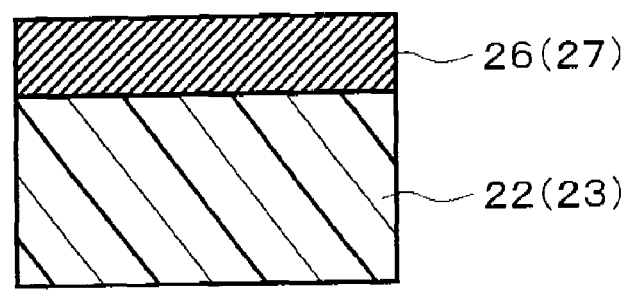
FIG. 5A is a sectional view showing an example of the layer structure of a surface coating layer.
Figure 5B:
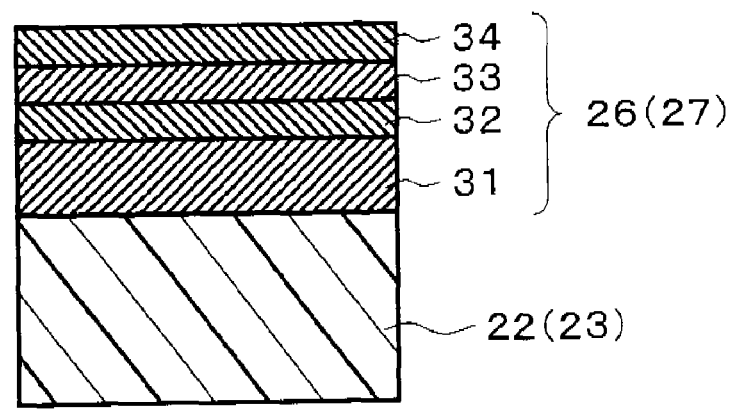
FIG. 5B is a sectional view showing another example of the layer structure of a surface coating layer.

FIGS. 5A and 5B are sectional views schematically showing the layer structure of the surface coating layers 26 and 27 formed on the exterior surfaces of the eyepiece prism 22 and the deflector prism 23, FIG. 5A showing a case in which the surface coating layers 26 and 27 are formed in a single layer, FIG. 5B showing a case in which the surface coating layers 26 and 27 are formed in a plurality of layer (as a multiple-layer film). As shown here, the surface coating layers 26 and 27 may be formed in a single layer or as a multiple-layer film.

In a case where the surface coating layers 26 and 27 are formed in a single layer as shown in FIG. 5A, the surface coating layers 26 and 27 may be formed of a material with a lower index of refraction than the material of the eyepiece prism 22 and the deflector prism 23. For example, in a case where the eyepiece prism 22 and the deflector prism 23 are formed of PMMA, the surface coating layers 26 and 27 may be formed of a low-refraction material such as $SiO_x$ (where $1 \leq x \leq 2$) or $Al_2O_3$, or an inorganic material containing a metal oxide such as a mixture of $SiO_2$ and $Al_2O_3$. Forming the surface coating layers 26 and 27 out of a material with a lower index of refraction than the material of the eyepiece prism 22 and the deflector prism 23 in this way offers a spillover effect whereby the surface reflectance of the joined optical member 21a can be reduced.

On the other hand, in a case where the surface coating layers 26 and 27 are formed as a multiple-layer film as shown in FIG. 5B, it is possible to use as the multiple-layer film one having a plurality of layers with different indices of refraction laid together. More specifically, it is possible to use a multiple-layer film having a plurality of low-refraction and high-refraction layers laid on one another with appropriate thicknesses. In the example shown in FIG. 5B, a low-refraction layer 31, a high-refraction layer 32, a high-refraction layer 33, and a low-refraction layer 34 are laid one after another in this order on the exterior surfaces of the eyepiece prism 22 and the deflector prism 23 to form a multiple-layer film. The low-refraction layers 31 and 34 are formed of, for example, one of the above-mentioned materials, namely $SiO_x$ (where $1 \leq x \leq 2$), $Al_2O_3$, a mixture of $SiO_2$ and $Al_2O_3$, or the like. The high-refraction layers 32 and 33 are formed of, for example, $TiO_2$, $ZrO_2$, $Ta_2O_5$, $CaO_2$, or the like.

Forming the surface coating layers 26 and 27 as a multiple-layer film as described above offers a stronger effect of reducing the surface reflectance (for example, to obtain lower surface reflectance at particular wavelengths, or to obtain low surface reflectance in a wider band of wavelengths).

When the surface coating layers 26 and 27 are provided with an anti-reflection property as described above, in the actual use of the joined optical member 21a, it is possible to efficiently extract the light (image light) that is made to exit by being reflected on the optical element 24 embedded between the eyepiece prism 22 and the deflector prism 23. It is also possible to transmit with higher transmittance the light (outside light) transmitted through the eyepiece prism 22, the deflector prism 23, and the optical element 24. Thus, both the image light and the outside light can be used with high light use efficiency, allowing the viewer to view both the displayed image and the outside world image clearly.

Moreover, forming the surface coating layers 26 and 27 out of an inorganic material containing a metal oxide as a main ingredient makes it easy to increase the surface hardness of the surface coating layers 26 and 27, and thereby to increase the mechanical strength of the surface coating layers 26 and 27. For example, $SiO_x$ (where $1 \leq x \leq 2$) has properties such that it not only exhibits strong adhesion to acrylic and cycloolefin-based resin as described above but also has higher surface hardness than those materials. More specifically, whereas PMMA has surface hardness equivalent to "H" on the scale of pencil lead hardness, $SiO_x$ (where $1 \leq x \leq 2$) has surface hardness equivalent to "4H" on the scale of pencil lead hardness. Here, the scale of pencil lead hardness is the one defined in JIS (Japanese Industrial Standards); on this scale, pencil leads are classified into 17 grades of hardness from "6B" (softest) to "9H" (hardest) according to what grades of pencil leads can make scratches on it.

Thus, forming the surface coating layers 26 and 27 out of one of the materials mentioned above, and forming the surface coating layers 26 and 27 having higher surface hardness than the eyepiece prism 22 and the deflector prism 23 on the exterior surfaces (the surfaces 22e and 23e) of the eyepiece prism 22 and the deflector prism 23 helps prevent the exterior surfaces of the eyepiece prism 22 and the deflector prism 23 from being scratched both during removal of the adhesive 25b and in actual use of the joined optical member 21a. In this way, also by forming the surface coating layers 26 and 27 having high surface hardness in this way, it is possible to obtain a stronger effect of preventing scratches than conventionally achieved, irrespective of the above-mentioned differences in adhesion strength among different pairs of materials. In particular, forming the surface coating layers 26 and 27 having higher surface hardness than the eyepiece prism 22 and the deflector prism 23 while fulfilling the above-described relationship in adhesion strength among different pairs of materials makes it possible to surely obtain an enhanced effect of preventing scratches. Since the surface coating layers 26 and 27 have high surface hardness, they can prevent themselves from being scratched.

5. Another Structure of the Image Display Apparatus

Figure 6A:
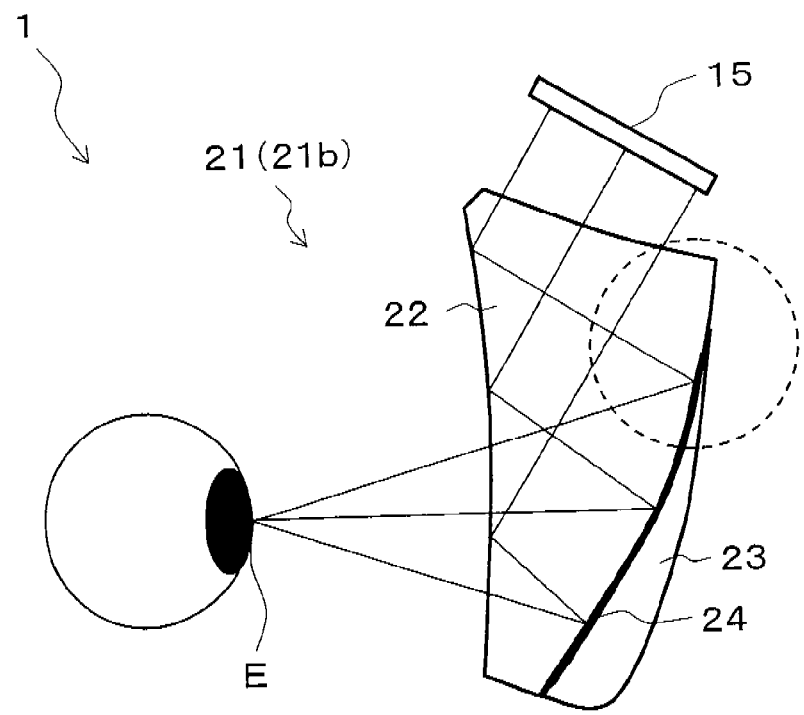
FIG. 6A is a sectional view showing another example of the structure of the above image display apparatus.

FIG. 6A is a sectional view showing another example of the structure of the image display apparatus 1. Except that it uses a joined optical member 21b as the eyepiece optical system 21, the image display apparatus 1 here is structured similarly to the image display apparatus 1 shown in FIG. 3. It should be noted that, in FIG. 6A, what is provided in the stage preceding the LCD 15 is omitted from illustration.

Figure 6B:
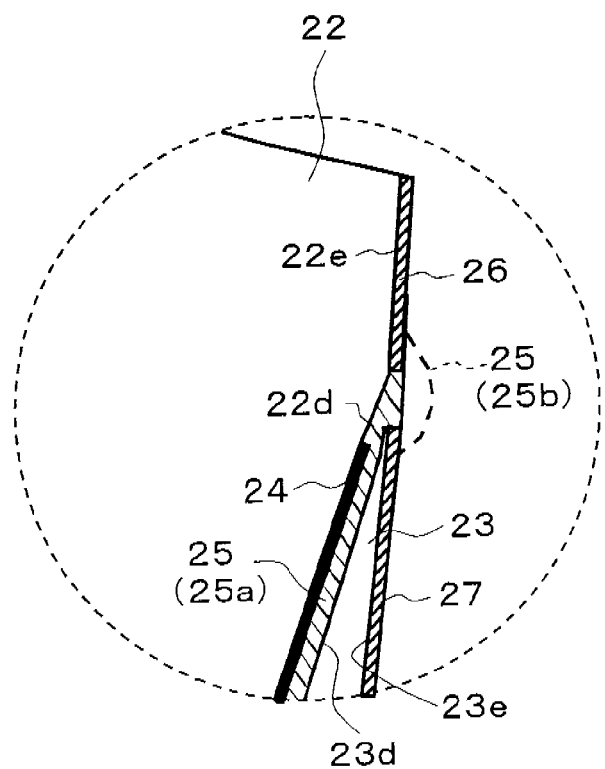
FIG. 6B is a sectional view showing, with enlargement, the joined parts of an eyepiece prism and a deflector prism in a joined optical member used in the eyepiece optical system of the above image display apparatus.

In the joined optical member 21a shown in FIGS. 1A, 1B, etc., at least the surfaces 22d and 22e of the eyepiece prism 22 and at least the surfaces 23d and 23e of the deflector prism 23 are flat surfaces; by contrast, in the joined optical member 21b, those surfaces are curved surfaces. FIG. 6B is a sectional view showing, with enlargement, the joined parts of the eyepiece prism 22 and the deflector prism 23 in the joined optical member 21b. In the joined optical member 21b, the surfaces 22d and 22e and the surfaces 23d and 23e are given, for example, aspherical or free-form curved shapes.

Moreover, in the joined optical member 21b, the optical element 24 embedded between the eyepiece prism 22 and the deflector prism 23 is not a HOE but a half-mirror. This half-mirror has an optical thin film, which is a metal reflective film formed of, for example, chromium or a multiple-layer film formed of inorganic materials. By controlling the film thickness and film structure of the optical thin film, it is possible to form the optical element 24 such that the ratio of the amount of transmitted light to the amount of reflected light is 1:1 (half) or equals any other desired value.

In the joined optical member 21b, surface coating layers 26 and 27 are formed beforehand on the surfaces 22e and 23e that will remain as exterior surfaces after the eyepiece prism 22 and the deflector prism 23 are joined together; in addition, the relationship in adhesion strength among different pairs of materials and the surface hardness of the surface coating layers 26 and 27 are appropriately set so that the adhesive 25b that oozes out during joining using the adhesive 25 can be easily removed. In these respects, the joined optical member 21b is similar to the joined optical member 21a.

Giving at least the surfaces 22d and 22e of the eyepiece prism 22 and at least the surfaces 23d and 23e of the deflector prism 23 curved shapes makes it possible to give the joined optical member 21b (eyepiece prism 22) a desired optical power. Thus, also with this structure, the viewer can view, with enlargement and as a satisfactorily aberration-corrected virtual image, the image displayed by the LCD 15, and can simultaneously view the outside world image through the eyepiece prism 22, the deflector prism 23, and the optical element 24. It is thereby also possible to give the eyepiece optical system 21 using the joined optical member 21b the function of an eyesight correcting lens.

6. Yet Another Structure of the Image Display Apparatus

Figure 7:
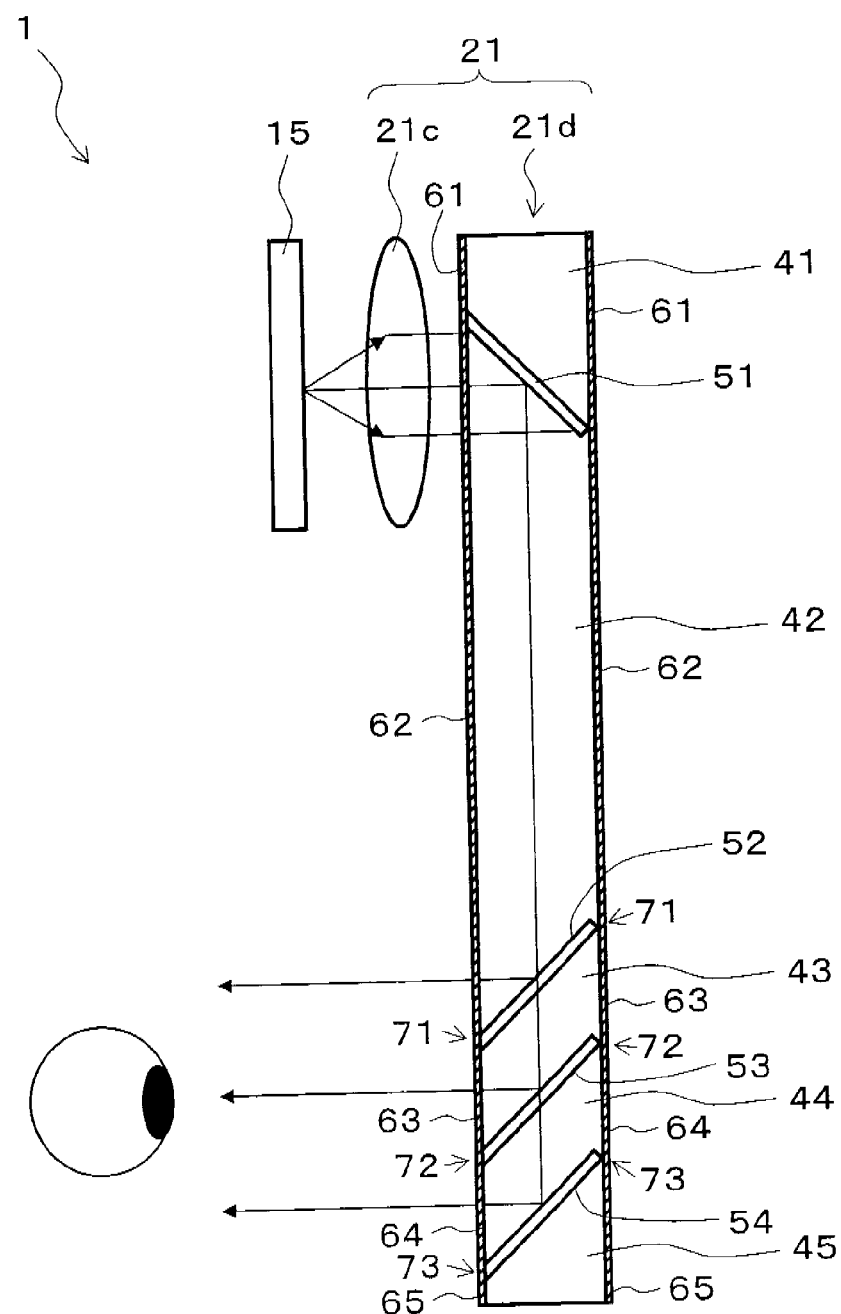
FIG. 7 is a sectional view showing yet another example of the structure of the above image display apparatus.

FIG. 7 is a sectional view showing yet another example of the structure of the image display apparatus 1. This image display apparatus 1 has a light source (unillustrated), a light guide plate (unillustrated), an LCD 15, and a eyepiece optical system 21. The eyepiece optical system 21 is composed of an eyepiece lens 21c and a joined optical member 21d. The eyepiece lens 21c forms an optical system by which the image light emanating from the LCD 15 is formed into a parallel beam and is directed to the joined optical member 21d.

The joined optical member 21d has, as a plurality of optical members, prisms 41 to 45 joined together with adhesive, and forms a plate-shaped plane-parallel plate as a whole. Between the prisms 41 and 42, there is embedded an optical element 51 that splits incident light such that the ratio of the amount of transmitted light to the amount of reflected light equals a predetermined value. Likewise, between the prisms 42 and 43, between the prisms 43 and 44, and between the prisms 44 and 45, there are embedded optical elements 52, 53, and 54, respectively, that split incident light such that the ratio of the amount of transmitted light to the amount of reflected light equals a predetermined value. Here, however, the optical element 51 is a reflective mirror that totally reflects incident light. The optical element 54 may also be a reflective mirror that totally reflects incident light; in a see-through type apparatus that allows the viewing of an outside world image, however, a half-mirror or the like is used instead. On those surfaces of the prisms 41 to 45 which remain as exterior surfaces after their joining together, surface coating layers 61 to 65 are formed before joining.

The prisms 41 to 45, the adhesive with which they are joined together, and the surface coating layers 61 to 65 are respectively formed of the materials of which the eyepiece prism 22 and the deflector prism 23, the adhesive 25, and the surface coating layers 26 and 27 described previously are formed. In the joined optical member 21d, the relationship in adhesion strength among different pairs of materials and the surface hardness of the surface coating layers 61 to 65 are appropriately set so that the adhesive that oozes out during joining can be easily removed. In these respects, the joined optical member 21d is similar to the joined optical members 21a and 21b.

In the image display apparatus 1 structured as shown in FIG. 7, the light from the light source enters the light guide plate so as to illuminate, as a surface light source, the LCD 15. The image light from the LCD 15 is formed by the eyepiece lens 21c into a parallel beam and then enters the joined optical member 21d. The light that has entered the joined optical member 21d is reflected on the optical element 51, and is guided inside the prism 42 to strike the optical element 52. Of the light that has struck the optical element 52, part is transmitted therethrough, and the rest is reflected thereon to be directed out (to a first optical pupil). The light transmitted through the optical element 52 is guided inside the prism 43 to strike the optical element 53 so that, of the light, part is transmitted therethrough and the rest is reflected thereon to be directed out (to a second optical pupil). The light transmitted through the optical element 53 is guided inside the prism 44 to strike the optical element 54 so that, of the light, part or the whole is reflected thereon to be directed out (a third optical pupil). Thus, the viewer can view the displayed image at the position of any of the optical pupils corresponding to the optical elements 52 to 54.

In the joined optical member 21d composed of a plurality of prisms 41 to 45 joined together as described above, the joined optical member 21d has a plurality of joint seams 71 to 73 in front of the viewer's eye, and the viewer views an outside world image through the area including the joint seams 71 to 73. According to the invention, however, the adhesive that oozes outside of the surface coating layers 61-65 during joining can be easily removed, and thus the joint seams 71 to 73 can be easily formed into smooth surfaces. Accordingly, when the viewer views the outside world image, even if the joint seams 71 to 73 are used as part of the effective area of the optical surfaces, the viewer can view the image clearly with less degradation of optical performance.

The light guided inside the prisms 42 to 44 may be guided without being totally reflected between opposite surfaces of the prisms 42 to 44 as described above, or may be guided by being totally reflected between opposite surfaces as shown in FIG. 3. Although, here, the number of prisms with which the joined optical member 21d is built is five, the joined optical member 21d can be built with three or more prisms. Although, here, four optical elements are embedded one between every two adjacent prisms, the number of optical elements used is not limited to four. That is, the joined optical member 21d can be built with two or more optical elements, with these optical elements embedded between adjacent prisms.

In a case where a plurality of optical elements are used, giving them increasingly low reflectance the closer they are located to the LCD 15 makes the image light reflected on each optical element more equally bright, and thus allows the viewer to view a satisfactory image with less uneven brightness. Adopting a structure in which the image light is reflected on a plurality of optical elements helps make the joined optical member 21d slim, and also makes it possible to widen the overall range in which the optical pupils are formed. Thus, even when the position of the viewer's pupil is displaced, the viewer can view a satisfactory image at the position of the corresponding optical pupil.

Needless to say, any of the features and methods described above may be combined with any other to build a joined optical member, an image display apparatus, and hence a HMD.

A joined optical member according to the invention can be used, for example, as an eyepiece optical system in an image display apparatus incorporated in a HMD.

The invention may alternatively be expressed as noted below; it then works and offers benefits as noted below.

According to the invention, a joined optical member includes a plurality of part optical members joined together with adhesive, and is formed by—forming, before the part optical members are joined together, a surface coating layer on the surfaces of the part optical members that will remain as exterior surfaces after the part optical members are joined together; then joining together the part optical members with the adhesive applied on the joined surfaces thereof, then hardening the adhesive until the superfluous part thereof that has oozed outside of the surface coating layer loses fluidity; and then wiping off the superfluous part of the adhesive. Here, the relationship in adhesion strength among different pairs of materials is such that (the adhesion strength between the surface coating layer and the part optical members)>(the adhesion strength between the surface coating layer and the adhesive) and simultaneously (the adhesion strength between the part optical members and the adhesive)>(the adhesion strength between the surface coating layer and the adhesive).

In the above structure, a surface coating layer is formed on the surfaces (for example, the entrance and exit surfaces at which outside light enters and exits) of the part optical members that will remain as exterior surfaces after the part optical members are joined together. Thus, when the part optical members are joined together with the adhesive applied to the joined surfaces, the superfluous part of adhesive oozes outside of the surface coating layer. The part of the adhesive that has oozed outside of the surface coating layer is wiped off and removed after it has hardened until it loses fluidity, that is, in its fully or half-hardened state. This helps prevent a recess from being formed in the adhesive between the joined surfaces, and thus helps prevent removal of more adhesive than is superfluous. Thus, it is possible to prevent degradation of the optical performance with which an outside world image can be viewed through the joint seam.

Moreover, the relationship in adhesion strength among different pairs of materials is such that (the adhesion strength between the surface coating layer and the part optical members)>(the adhesion strength between the surface coating layer and the adhesive). Thus, while the surface coating layer on the exterior surfaces of the part optical members is maintained, the adhesive on the surface coating layer can be easily wiped off and removed (during the removal of the adhesive, the surface coating layer does not come off the surfaces of the part optical members). Thus, during the removal of the adhesive, the exterior surfaces of the part optical members are prevented form being scratched. Here, the relationship in adhesion strength among different pairs of materials is simultaneously such that (the adhesion strength between the part optical members and the adhesive)>(the adhesion strength between the surface coating layer and the adhesive). Thus, during the removal of the adhesive on the surface coating layer, the joined parts of the part optical members (the parts thereof which are joined together with the adhesive) do not split.

Moreover, since the relationship in adhesion strength among different pairs of materials is such that (the adhesion strength between the surface coating layer and the part optical members)>(the adhesion strength between the surface coating layer and the adhesive), and thus the adhesion between the surface coating layer and the part optical members is strong, even after the adhesive on the surface coating layer is removed, the surface coating layer can be maintained on the exterior surfaces of the part optical members. Thus, even in a case where, in actual use of the joined optical member, the exterior surfaces thereof are used as optical surfaces (for example, light-transmitting or light-reflecting surfaces), it is possible to prevent those optical surfaces from being scratched, and thereby to prevent degradation of optical performances thereon.

That is, with the above structure, not only during removal of adhesive, but also in actual use, it is possible to prevent the exterior surfaces of the part optical members from being scratched, and thereby to obtain a stronger effect of preventing scratches than conventionally achieved. In particular, it is possible to prevent degradation of optical performance on optical surfaces in actual use.

In the joined optical member according to the invention, it is preferable that the surface hardness of the surface coating layer be higher than that of the part optical members. In that case, the surface coating layer surely protects the exterior surfaces of the part optical members; thus, during removal of adhesive and in actual use of the joined optical member, it is possible to surely prevent scratches on the exterior surfaces of the part optical members.

According to the invention, a joined optical member includes a plurality of part optical members joined together with adhesive, and is formed by—forming, before the part optical members are joined together, a surface coating layer on the surfaces of the part optical members that will remain as exterior surfaces after the part optical members are joined together; then joining together the part optical members with the adhesive applied on the joined surfaces thereof; then hardening the adhesive until the superfluous part thereof that has oozed outside of the surface coating layer loses fluidity; and then wiping off the superfluous part of the adhesive. Here, the surface hardness of the surface coating layer is higher than surface hardness of the part optical members.

In the above structure, a surface coating layer is formed on the surfaces (for example, the entrance and exit surfaces at which outside light enters and exits) of the part optical members that will remain as exterior surfaces after the part optical members are joined together. Thus, when the part optical members are joined together with the adhesive applied to the joined surfaces, the superfluous part of adhesive oozes outside of the surface coating layer. The part of the adhesive that has oozed outside of the surface coating layer is wiped off and removed after it has hardened until it loses fluidity, that is, in its fully or half-hardened state. This helps prevent a recess from being formed in the adhesive between the joined surfaces, and thus helps prevent removal of more adhesive than is superfluous. Thus, it is possible to prevent degradation of the optical performance with which an outside world image can be viewed through the joint seam.

Moreover, on the exterior surfaces of the part optical members, a surface coating layer having higher surface hardness than the part optical members is formed. Thus, not only during removal of adhesive but also in actual use of the joined optical member, it is possible to protect the exterior surfaces of the part optical members with the surface coating layer, and thereby to prevent scratches on the exterior surfaces. In this way, it is possible to obtain a stronger effect of preventing scratches than conventionally achieved, and, in particular, it is possible to prevent degradation of optical performance on the optical surfaces in actual use.

In the joined optical member according to the invention, the adhesive may be formed of an organic material, and the surface coating layer may be formed of an inorganic material.

An organic material and an inorganic material typically have weak adhesion between them. Accordingly, forming the adhesive out of an organic material and forming the surface coating layer out of an inorganic material helps weaken the adhesion between the adhesive and the surface coating layer and thereby make the removal of the adhesive easy. Moreover, since an inorganic material has high surface hardness, by forming a surface coating layer having higher surface hardness than the part optical members, it is possible to surely prevent the exterior surfaces of the part optical members from being scratched in actual use of the joined optical member.

In the joined optical member according to the invention, it is preferable that the inorganic material contain a metal oxide.

A metal oxide exhibits high adhesion to particular organic materials (for example, acrylic and cycloolefin-based organic materials) but low adhesion to other particular organic materials (for example, light-curing materials that harden on irradiation with ultraviolet rays or visible light, in their hardened or half-hardened state). This makes it possible to increase the adhesion between the surface coating layer and the part optical members to thereby prevent the surface coating layer from coming off the part optical members when adhesive is wiped off, and to reduce the adhesion between the adhesive and the surface coating layer to thereby make it easy to wipe off adhesive. It is also possible to increase the surface hardness of the surface coating layer easily, and to increase the mechanical strength of the surface coating layer easily.

In the joined optical member according to the invention, it is preferable that the metal oxide be $SiO_x$ (where $1 \leq x \leq 2$), $TiO_2$, $Al_2O_3$, $Ta_2O_5$, or a mixture of any two or more thereof.

In that case, the surface coating layer can be easily formed on the surfaces of the part optical members by vacuum deposition, sputtering, or the like. Moreover, by one of these methods, the metal oxide can be made to adhere strongly to the part optical members (formed of, for example, an organic material).

In the joined optical member according to the invention, it is preferable that the part optical members and the adhesive be all formed of an acrylic or cycloolefin-based organic material.

In that case, the part optical members and the adhesive are formed of materials of the same family, and this makes it easy to increase the adhesion between them. That is, it is easy to increase the joining strength among the part optical members. Moreover, since an acrylic or cycloolefin-based organic material is highly transparent and lowly birefringent, it helps realize a joined optical member that offers satisfactory optical performance. Furthermore, while the part optical members and the adhesive are formed of the same organic material, it is easy to control the adhesion between the part optical members and the surface coating layer and the adhesion between the adhesive and the surface coating layer, as by increasing the adhesion between the part optical members and the surface coating layer and reducing the adhesion between the surface coating layer and the adhesive.

For example, it is possible to obtain strong adhesion between the part optical members and the surface coating layer by a method such as vacuum deposition, sputtering, or the like. In that case, also depending on the method of film formation used, it is possible to greatly vary the adhesion obtained. On the other hand, the adhesion between the surface coating layer and adhesive hardened by irradiation with ultraviolet rays (in a hardened or half-hardened state) is low, and this is particularly marked when the adhesive is in a half-hardened state.

In the joined optical member according to the invention, the surface coating layer may be formed of a material whose index of refraction is lower than the index of refraction of the part optical members. This helps reduce the surface reflectance of the joined optical member.

In the joined optical member according to the invention, the surface coating layer may be formed of a multiple-layer film having a plurality of layers with different indices of refraction laid together.

The multiple-layer film may be assumed to be, for example, one having a plurality of low-refraction and high-refraction layers laid on one another with appropriate thicknesses. Forming such a multiple-layer film as the surface coating layer also helps reduce the surface reflectance of the joined optical member. It is also possible to reduce the surface reflectance only for light in a particular wavelength band.

In the joined optical member according to the invention, an optical element may be embedded between the joined surfaces of the part optical members.

In that case, it is possible, for example, to bend, with the optical element, the light that has entered the part optical members to make it exit in a predetermined direction, and thereby to realize desired optical performance. Moreover, since the optical element is isolated from outside air, it is possible to maintain stable optical performance.

In the joined optical member according to the invention, it is preferable that the optical element be a volume-phase reflection hologram optical element.

A volume-phase reflection hologram optical element ("HOE") has a narrow reflection wavelength band and exhibits high transmittance to the light of an outside world image. Thus, incorporating such an optical element in the joined optical member and applying it to an image display apparatus that permits see-through viewing of an outside world image allows the viewer to view the outside world image clearly.

In the joined optical member according to the invention, at least part of the joint seams that will remain as exterior surfaces after the part optical members are joined together is included in the effective area of an optical surface.

According to the invention, adhesive on the surface coating layer can be easily wiped off and removed, and thus the joint seams between the part optical members can be formed smooth along the exterior surfaces. Thus, even in a structure where at least part of a joint seam is included in at least part of the effective area of an optical surface, it is possible to obtain satisfactory optical performance at the joint seam, and to efficiently use the light that enters at the joint seam.

According to the invention, an image display apparatus is provided with: a light source that is built with a light-emitting diode; an image display element that displays an image by modulating light from the light source; and the above-described joined optical member according to the invention. Here, the joined optical member includes, as an optical element embedded between the joined surfaces of the part optical members, a volume-phase reflection hologram optical element. The image light from the image display element is shone into the part optical members via the entrance surface thereof and is then totally reflected a plurality of times inside the part optical member so as to be directed to the hologram optical element so that the image light is reflected and enlarged by the hologram optical element and is then shone out of the part optical members via the exit surface thereof so as to be directed as a virtual image to a viewer's eye while simultaneously the light of an outside world image is transmitted through the hologram optical element and is directed to the viewer's eye.

In the above structure, the light (LED light) emitted from the light source is modulated by the image display element and exits therefrom as image light. The image light enters the part optical members via the entrance surface thereof, is then totally reflected a plurality of times inside, and is then reflected by the HOE so as to exit via the exit surface. Thus, the viewer can view the image in the form of an enlarged virtual image. In addition, the light of an outside world image that has been transmitted through the HOE is directed to the viewer's eye, and thus the viewer can view the virtual image and the outside world image simultaneously.

Building the apparatus with a HOE in this way allows the HOE to be shared as an eyepiece optical system, and thus helps make the apparatus compact and lightweight. Moreover, matching the light emission wavelengths of the LED used as the light source and the diffraction wavelengths of the HOE makes it possible to present the viewer with a bright image. Furthermore, the structure exploiting total reflection inside the part optical members helps make the joined optical member compact and lightweight, and also helps increase the transmissivity to the light of the outside world image, allowing satisfactory viewing of the outside world image. Moreover, it is possible to arrange the image display element around the field of view, and thereby to obtain a wide field of view of the outside world.

In particular, with the joined optical member according to the invention, the surface coating layer prevents the exterior surfaces of the part optical members from being scratched. Thus, in actual use where, for example, the image display apparatus is applied to an HMD, it is possible to effectively obtain an effect of preventing scratches. Furthermore, for example, when the surface coating layer is provided with an anti-reflection property, it is possible to efficiently extract, via an optical surface (exit surface), the image light reflected on the HOE. Moreover, it is also possible to efficiently transmit, via optical surfaces (entrance and exit surfaces) of the part optical members, the light of the outside world image. Thus, it is possible to efficiently use both image light and outside light, allowing the viewer to view both the displayed image and the outside world image clearly.

In the image display apparatus according to the invention, the hologram optical element may have a positive non-axisymmetric optical power to enlarge the image displayed by the image display element, and may form at least part of the eyepiece optical system through which the displayed image is directed as a virtual image to the observer's eye.

In that case, the eyepiece optical system can be made compact, and the viewer can be presented with a satisfactorily aberration-corrected image.

According to the invention, a head-mounted display is provided with: the above-described image display apparatus according to the invention; and supporting means for supporting the image display apparatus in front of the observer's eye.

With this structure, the image display apparatus is supported in front of the viewer's eye by the supporting means. This leaves the viewer with his hands free, and thus the viewer can, while viewing the outside world image along with (a virtual image of) the image displayed by the image display element, do what he wants to do with his free hands. Moreover, since the viewer can keep his viewing direction fixed, he can easily find the displayed image even in a low-light environment. Furthermore, in the joined optical member applied to the above image display apparatus, the surface coating layer prevents scratches on the exterior surfaces, and thus, in actual use of the HMD, it is possible to effectively obtain an effect of preventing scratches.

It should be understood that any embodiments, examples, and the like specifically described herein are merely intended to clarify the technical features of the invention and thus are not intended to limit in any way the interpretation of the invention; that is, the invention may be put into practice with any modifications and variations made within the scope of the appended claims.

What is claimed is:

1. A joined optical member comprising a plurality of part optical members joined together with adhesive,
    each of the part optical members having exterior surfaces and joined surfaces separate from exterior surfaces,
    wherein the joined optical member is formed by
        forming, before the part optical members are joined together, a surface coating layer on the exterior surfaces of the part optical members, then
        joining together the part optical members with the adhesive applied on joined surfaces thereof so that the joined surfaces are positioned in opposition with respect to each other with the adhesive disposed therebetween, then
        hardening the adhesive until a superfluous part thereof that has oozed from between the joined surfaces loses fluidity, and then
        wiping off the superfluous part of the adhesive, and
    wherein a relationship in adhesion strength among different pairs of materials is such that (adhesion strength between the surface coating layer and the part optical members)>(adhesion strength between the surface coating layer and the adhesive) and simultaneously (adhesion strength between the part optical members and the adhesive)>(adhesion strength between the surface coating layer and the adhesive).

2. The joined optical member according to claim 1, wherein surface hardness of the surface coating layer is higher than surface hardness of the part optical members.

3. The joined optical member according to claim 1,
wherein the adhesive is formed of an organic material, and
wherein the surface coating layer is formed of an inorganic material.

4. The joined optical member according to claim 3, wherein the inorganic material contains a metal oxide.

5. The joined optical member according to claim 4, wherein the metal oxide is $SiO_x$ (where $1 \leq x \leq 2$), $TiO_2$, $Al_2O_3$, $Ta_2O_5$, or a mixture of any two or more thereof.

6. The joined optical member according to claim 3, wherein the part optical members and the adhesive are all formed of an acrylic or cycloolefin-based organic material.

7. The joined optical member according to claim 1, wherein the surface coating layer is formed of a material whose index of refraction is lower than an index of refraction of the part optical members.

8. The joined optical member according to claim 1, wherein the surface coating layer is formed of a multiple-layer film having a plurality of layers with different indices of refraction laid together.

9. The joined optical member according to claim 1, further comprising an optical element embedded between the joined surfaces of the part optical members.

10. The joined optical member according to claim 9, wherein the optical element is a volume-phase reflection hologram optical element.

11. The joined optical member according to claim 1,
wherein after joining the part optical members, boundaries between the joined surfaces comprise joint seams,
wherein the joined surfaces are positioned so that an exposed part of the joint seams is included in an effective area of an optical surface.

12. An image display apparatus comprising:
a light source comprising a light-emitting diode;
an image display element displaying an image by modulating light from the light source; and
the joined optical member according to claim 1,
wherein the joined optical member comprises, as an optical element embedded between the joined surfaces of the part optical members, a volume-phase reflection hologram optical element, and
wherein image light from the image display element is shone into the joined optical member via an entrance surface thereof and is then totally reflected a plurality of times inside the joined optical member so as to be directed to the hologram optical element so that the image light is reflected and enlarged by the hologram optical element and is then shone out of the joined optical member via an exit surface thereof so as to be directed as a virtual image to a viewer's eye while simultaneously light of an outside world image is transmitted through the hologram optical element and is directed to the viewer's eye.

13. The image display apparatus according to claim 12,
wherein the hologram optical element has a positive nonaxisymmetric optical power to enlarge an image displayed by the image display element, and forms at least part of an eyepiece optical system through which the displayed image is directed as a virtual image to the observer's eye.

14. A head-mounted display comprising:
the image display apparatus according to claim 12; and
a support mechanism supporting the image display apparatus in front of the observer's eye.

15. A joined optical member comprising a plurality of part optical members joined together with adhesive,
each of the part optical members having exterior surfaces and joined surfaces separate from exterior surfaces,
wherein the joined optical member is formed by
forming, before the part optical members are joined together, a surface coating layer on the exterior surfaces of the part optical members, then
joining together the part optical members with the adhesive applied on joined surfaces thereof so that the joined surfaces are positioned in opposition with respect to each other with the adhesive disposed therebetween, then
hardening the adhesive until a superfluous part thereof that has oozed from between the joined surfaces loses fluidity, and then
wiping off the superfluous part of the adhesive, and
wherein surface hardness of the surface coating layer is higher than surface hardness of the part optical members.

16. The joined optical member according to claim 15,
wherein the adhesive is formed of an organic material, and
wherein the surface coating layer is formed of an inorganic material.

17. The joined optical member according to claim 16, wherein the inorganic material contains a metal oxide.

18. The joined optical member according to claim 17, wherein the metal oxide is $SiO_x$ (where $1 \leq x \leq 2$), $TiO_2$, $Al_2O_3$, $Ta_2O_5$, or a mixture of any two or more thereof.

19. The joined optical member according to claim 16, wherein the part optical members and the adhesive are all formed of an acrylic or cycloolefin-based organic material.

20. The joined optical member according to claim 15, wherein the surface coating layer is formed of a material whose index of refraction is lower than an index of refraction of the part optical members.

21. The joined optical member according to claim 15, wherein the surface coating layer is formed of a multiple-layer film having a plurality of layers with different indices of refraction laid together.

22. The joined optical member according to claim 15, further comprising an optical element embedded between the joined surfaces of the part optical members.

23. The joined optical member according to claim 22, wherein the optical element is a volume-phase reflection hologram optical element.

24. The joined optical member according to claim 15,
wherein after joining the part optical members, boundaries between the joined surfaces comprise joint seams,
wherein the joined surfaces are positioned so that an exposed part of the joint seams is included in an effective area of an optical surface.

25. An image display apparatus comprising:
a light source comprising a light-emitting diode;
an image display element displaying an image by modulating light from the light source; and
the joined optical member according to claim 15,
wherein the joined optical member comprises, as an optical element embedded between the joined surfaces of the part optical members, a volume-phase reflection hologram optical element, and
wherein image light from the image display element is shone into the joined optical member via an entrance surface thereof and is then totally reflected a plurality of times inside the joined optical member so as to be directed to the hologram optical element so that the image light is reflected and enlarged by the hologram optical element and is then shone out of the joined optical member via an exit surface thereof so as to be directed as a virtual image to a viewer's eye while simultaneously light of an outside world image is transmitted through the hologram optical element and is directed to the viewer's eye.

26. The image display apparatus according to claim 25, wherein the hologram optical element has a positive non-axisymmetric optical power to enlarge an image displayed by the image display element, and forms at least part of an eyepiece optical system through which the displayed image is directed as a virtual image to the observer's eye.

27. A head-mounted display comprising:
the image display apparatus according to claim 25; and
a support mechanism supporting the image display apparatus in front of the observer's eye.

28. A method of making a joined optical member, the joined optical member comprising a plurality of part optical members, each of the part optical members having exterior surfaces and joined surfaces separate from exterior surfaces, comprising the following steps:
   forming, before the part optical members are joined together, a surface coating layer on exterior surfaces of the part optical members,
   joining together the part optical members with an adhesive applied on joined surfaces thereof so that the joined surfaces are positioned in opposition with respect to each other with the adhesive disposed therebetween,
   hardening the adhesive until a superfluous part thereof that has oozed from between the joined surfaces loses fluidity, and
   wiping off the superfluous part of the adhesive,
   wherein a relationship in adhesion strength among different pairs of materials is such that (adhesion strength between the surface coating layer and the part optical members)>(adhesion strength between the surface coating layer and the adhesive) and simultaneously (adhesion strength between the part optical members and the adhesive)>(adhesion strength between the surface coating layer and the adhesive).

29. The joined optical member according to claim 28, wherein a surface hardness of the surface coating layer is higher than a surface hardness of the part optical members.

30. A joined optical member comprising:
a plurality of part optical members, each having exterior surfaces and joined surfaces separate from exterior surfaces,
a surface coating layer disposed on exterior surfaces of the part optical members,
the part optical members being joined with an adhesive so that the joined surfaces are positioned in opposition with respect to each other with the adhesive disposed therebetween,
wherein the adhesion strength among different pairs of materials is such that (adhesion strength between the surface coating layer and the part optical members)>(adhesion strength between the surface coating layer and the adhesive) and simultaneously (adhesion strength between the part optical members and the adhesive)>(adhesion strength between the surface coating layer and the adhesive).

31. A method of making a joined optical member, the joined optical member comprising a plurality of part optical members, each of the part optical members having exterior surfaces and joined surfaces separate from exterior surfaces, comprising the following steps:
   forming, before the part optical members are joined together, a surface coating layer on exterior surfaces of the part optical members,
   joining together the part optical members with an adhesive applied on joined surfaces thereof so that the joined surfaces are positioned in opposition with respect to each other with the adhesive disposed therebetween,
   hardening the adhesive until a superfluous part thereof that has oozed from between the joined surfaces loses fluidity, and
   wiping off the superfluous part of the adhesive,
   wherein a surface hardness of the surface coating layer is higher than a surface hardness of the part optical members.

32. A joined optical member comprising:
a plurality of part optical members, each having exterior surfaces and joined surfaces separate from exterior surfaces,
a surface coating layer disposed on exterior surfaces of the part optical members,
the part optical members being joined with an adhesive so that the joined surfaces are positioned in opposition with respect to each other with the adhesive disposed therebetween,
wherein a surface hardness of the surface coating layer is higher than a surface hardness of the part optical members.

* * * * *